(12) United States Patent  
Emaru

(10) Patent No.: US 9,081,610 B2
(45) Date of Patent: Jul. 14, 2015

(54) METHOD AND APPARATUS TO MAXIMIZE RETURN ON INVESTMENT IN HYBRID CLOUD ENVIRONMENT

(75) Inventor: Hironori Emaru, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 50 days.

(21) Appl. No.: 13/525,654

(22) Filed: Jun. 18, 2012

(65) Prior Publication Data

US 2013/0339419 A1    Dec. 19, 2013

(51) Int. Cl.
*G06F 9/48* (2006.01)
*G06F 9/50* (2006.01)

(52) U.S. Cl.
CPC ........... *G06F 9/4856* (2013.01); *G06F 9/5072* (2013.01)

(58) Field of Classification Search
USPC .................................. 709/201, 224–226, 229
See application file for complete search history.

(56) References Cited

U.S. PATENT DOCUMENTS

| | | | |
|---|---|---|---|
| 8,037,187 B2 | 10/2011 | Dawson et al. | |
| 2003/0200333 A1* | 10/2003 | Espieu et al. | 709/240 |
| 2011/0016214 A1 | 1/2011 | Jackson | |
| 2011/0145392 A1 | 6/2011 | Dawson et al. | |
| 2011/0145413 A1 | 6/2011 | Dawson et al. | |
| 2011/0145439 A1 | 6/2011 | Chaturvedi et al. | |
| 2011/0231899 A1 | 9/2011 | Pulier et al. | |
| 2011/0289329 A1* | 11/2011 | Bose et al. | 713/320 |
| 2011/0307903 A1* | 12/2011 | Vaddagiri | 718/105 |
| 2012/0054771 A1* | 3/2012 | Krishnamurthy et al. | 718/105 |
| 2012/0173717 A1* | 7/2012 | Kohli | 709/224 |
| 2012/0180058 A1* | 7/2012 | Barsness et al. | 718/102 |
| 2012/0185913 A1* | 7/2012 | Martinez et al. | 726/1 |
| 2013/0275382 A1* | 10/2013 | Chi et al. | 707/654 |
| 2013/0290513 A1* | 10/2013 | Shikari et al. | 709/224 |

* cited by examiner

*Primary Examiner* — Ebrahim Golabbakhsh
(74) *Attorney, Agent, or Firm* — Mattingly & Malur, PC

(57) ABSTRACT

Exemplary embodiments improve return on investment in hybrid cloud environment. In one embodiment, a computer comprises: a memory; and a processor operable to manage two types of clouds, which are private and public clouds, by using information stored in the memory, and to manage migration of a set of an application and a data between a first type of clouds and a second type of clouds of the two types of clouds, the application running on a server of the first type of clouds, the data to be read or written by the application and being stored in a storage system of the first type of clouds. The processor manages the migration of the set of the application and the data between the first type of clouds and the second type of clouds based on resource utilization of resources including at least one of the server or the storage system.

20 Claims, 17 Drawing Sheets

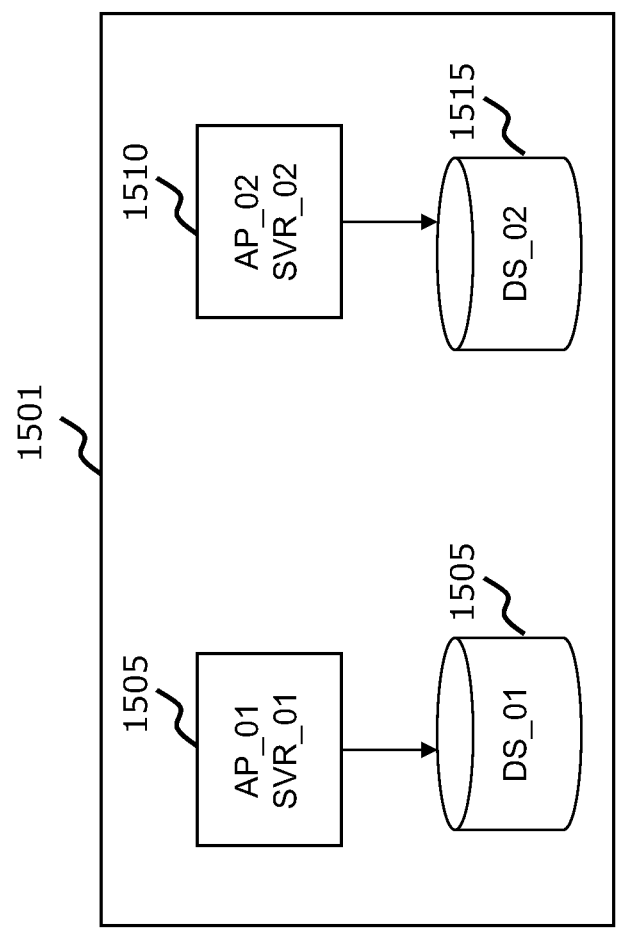
Fig. 1-A

| Cloud ID | Type | Initial Cost | Compute | | | Storage | | |
|---|---|---|---|---|---|---|---|---|
| | | | Unit Utilization Cost | Total Amount | Used Amount | Unit Utilization Cost | Total Amount | Used Amount |
| Private_A | Private | 1500 | 1.2 | 500 | 300 | 1.5 | 600 | 450 |
| Public_A | Public | - | 3.0 | Unlimited | 280 | 2.4 | Unlimited | 155 |
| Public_B | Public | - | 2.4 | Unlimited | 420 | 2.6 | Unlimited | 600 |

Fig. 6

| Application ID | AP_01 | AP_02 | AP_03 | ... |
|---|---|---|---|---|
| Location | Private_A | Public_A | Public_B | ... |
| Remaining Period (days) | 5 | Unknown | 158 | ... |
| Compute 0 | 18 | 12 | 46 | ... |
| 1 | 18 | 18 | 44 | ... |
| 2 | 16 | 3 | 42 | ... |
| .. | .. | .. | .. | ... |
| Storage 0 | 26 | 18 | 133 | ... |
| 1 | 51 | 17 | 125 | ... |
| 2 | 50 | 17 | 122 | ... |
| .. | .. | .. | .. | ... |

Fig. 7

| Cloud ID | Type | Security Level | Initial Cost | Compute | | | Storage | | |
|---|---|---|---|---|---|---|---|---|---|
| | | | | Unit Utilization Cost | Total Amount | Used Amount | Unit Utilization Cost | Total Amount | Used Amount |
| Private_A | Private | 5 | 1500 | 1.2 | 500 | 300 | 1.5 | 600 | 450 |
| Public_A | Public | 3 | - | 3.0 | Unlimited | 280 | 2.4 | Unlimited | 155 |
| Public_B | Public | 1 | - | 2.4 | Unlimited | 420 | 2.6 | Unlimited | 600 |

Fig. 10

| | | Application ID | AP_01 | AP_02 | AP_03 | ... |
|---|---|---|---|---|---|---|
| | | Location | Private_A | Public_A | Public_B | ... |
| | | Remaining Period (days) | 5 | Unknown | 158 | |
| | | Security Level | 5 | 2 | 4 | |
| Compute | | 0 | 18 | 12 | 46 | ... |
| | | 1 | 18 | 18 | 44 | ... |
| | | 2 | 16 | 3 | 42 | ... |
| | | .. | .. | .. | .. | ... |
| Storage | | 0 | 26 | 18 | 133 | ... |
| | | 1 | 51 | 17 | 125 | ... |
| | | 2 | 50 | 17 | 122 | ... |
| | | .. | .. | .. | .. | ... |

Fig. 11

| Application ID | AP_01 | AP_03 | AP_10 | ... |
|---|---|---|---|---|
| Running Interval | Daily | Monthly | Weekly | |
| Start Time | 2:00 | Every last Sunday 1:00 of the month | Every Saturday 4:00 | |

Fig. 14

| | | 7105 | 7110 | 7115 | |
|---|---|---|---|---|---|
| Application ID | | AP_01 | AP_02 | AP_ETL | ... |
| Location | | Private_A | Private_A | Private_A | ... |
| Remaining Period (days) | | Unknown | Unknown | 158 | |
| Security Level | | 5 | 2 | 4 | |
| Server | | SVR_01 | SVR_02 | SVR_03 | |
| Data store | | DR_01 | DR_02 | DR_01, DR_02 | |
| Compute | 0 | 18 | 12 | 46 | ... |
| | 1 | 18 | 18 | 44 | ... |
| | 2 | 16 | 3 | 42 | ... |
| | : | : | : | : | ... |
| Storage | 0 | 26 | 18 | 133 | ... |
| | 1 | 51 | 17 | 125 | ... |
| | 2 | 50 | 17 | 122 | ... |
| | : | : | : | : | ... |

Fig. 16

METHOD AND APPARATUS TO MAXIMIZE RETURN ON INVESTMENT IN HYBRID CLOUD ENVIRONMENT

BACKGROUND OF THE INVENTION

The present invention relates generally to cloud computing and, more particularly, to improving and preferably maximizing the return on investment (ROI) in a hybrid cloud environment.

Cloud computing is widely used. Cloud computing includes computing on public cloud, private cloud, and hybrid cloud. There are several ways to utilize multiple cloud computing environments. One way is to introduce an abstraction layer to integrate the management points of multiple clouds. One stop portal is provided on this abstraction layer. As a result, the user does not need to use multiple clouds properly. Another way involves migration of workload among multiple clouds. When a workload exceeds the threshold in one cloud, the workload is migrated to another cloud. This function maintains the SLA (Service Level Agreement) of each workload.

There are problems with the current approaches of utilizing multiple cloud computing environments. In the near future, most of the enterprises may utilize both public cloud and private cloud. From the enterprise perspective, the cost structure between private cloud and public cloud is different. Private cloud is owned as assets by the enterprise. Public cloud is used as a pay-as-you-go resource. To maximize the ROI (Return on Investment), the enterprise should recognize these differences in its utilization of private and public clouds.

The current approaches do not provide a standpoint on how an enterprise can maximize the ROI for IT investment in utilizing hybrid clouds. For example, US2011/0231899 discloses systems and methods for one or more cloud computing abstraction layers. The user can plan cloud-computing services, build a cloud-computing service, publish the cloud-computing service for consumption by users, or run the cloud-computing service. Access to disparate public or private cloud-computing resources is through a common interface. Although the reference relates to multiple clouds, it does not distinguish between public cloud and private cloud and does not provide a way to maximize the ROI.

US2011/0145439 provides technology neutral process integration (Cloud Resource Planning), and optimization methodology leveraging a business meta-schema format Cloud Data Interchange (CDI) to integrate, enable, and invoke Cloud services. It provides an abstraction or resource planning layer. The customer does not have to have knowledge or choose different Cloud types and/or understand or choose each underlying service. As such, it provides a one stop portal. Again, although the reference relates to multiple clouds, it does not distinguish between public cloud and private cloud and does not provide a way to maximize the ROI.

US2011/0145413 and U.S. Pat. No. 8,037,187 provide a solution for resource sharing within a cloud-computing environment. One objective is to better utilize idle public or private Cloud infrastructures and improve the availability of Cloud services by allowing different Cloud service providers to virtually combine their services and infrastructures. In the event that there is not enough capacity for a single Cloud service provider to manage its workload, the workload may be shifted to additional infrastructures within the Cloud. Although the reference relates to multiple clouds, it does not distinguish between public cloud and private cloud and does not provide a way to maximize the ROI.

US2011/0145392 provides a solution for enabling the dynamic provisioning (migration) of Cloud-based jobs and resources. Each movement scenario is assigned a specific technique based on rules, profiles, SLA, and/or other such criteria and agreements. Such dynamic adjustments may be especially advantageous in order to balance real-time workload to avoid over-provisioning, to manage Cloud performance, to attain a more efficient or cost-effective execution environment, to off-load a Cloud or specific Cloud resources for maintenance/service, and the like. Coupled devices appear to end-users as a single pool of resources. Again, although the reference relates to multiple clouds, it does not distinguish between public cloud and private cloud and does not provide a way to maximize the ROI.

US2011/0016214 relates to brokering service for computer resources. The brokering services system can aggregate resources for multiple cloud service providers and act as an advocate for or a guarantor of the SLA associated with the workload. A method of providing a brokering for compute resources includes identifying resource capabilities (configuration), receiving a request for compute resources and selecting compute resources, and monitoring workload. The reference does not distinguish between public cloud and private cloud.

BRIEF SUMMARY OF THE INVENTION

Exemplary embodiments of the invention provide a technique to improve and preferably maximize the ROI for IT investment in a hybrid cloud environment composed of private cloud and public cloud. A management program executes the following procedure to maximize the ROI for IT investment when an enterprise utilizes a hybrid cloud environment composed of private cloud(s) and public cloud(s). When the resource utilization ratio of a private cloud exceeds a threshold, more dynamic applications are migrated to the public cloud. "More dynamic" means, for example, an application whose standard deviation of resource utilization is large, an application whose growth ratio of resource utilization is high, or an application whose remaining period is short, when compared with other applications. Otherwise, when the resource utilization ratio of a private cloud falls below the threshold, more stable applications are migrated to the private cloud. "More stable" is the opposite of "more dynamic" for an application when compared with other applications.

In accordance with an aspect of the present invention, a computer comprises: a memory; and a processor being operable to manage two types of clouds, which are private and public clouds, by using information stored in the memory, and to manage a migration of a set of an application and a data between a first type of clouds and a second type of clouds of the two types of clouds, the application running on a server of the first type of clouds, the data to be read or written by the application and being stored in a storage system of the first type of clouds. The processor manages the migration of the set of the application and the data between the first type of clouds and the second type of clouds based on resource utilization of resources including at least one of the server or the storage system.

In some embodiments, the processor is configured to manage the migration using a threshold defined based on at least one of server usage rate or storage usage rate. The processor is configured to migrate the set of the application and the data, from the first type of clouds including one or more private clouds to the second type of clouds including one or more public clouds, if the resource utilization of the private cloud exceeds a first threshold; and the first threshold is defined based on server usage rate and storage usage rate. The processor is configured to migrate the set of the application and the data, from the second type of clouds including one or more public clouds to the second type of clouds including one or more private clouds, if the resource utilization of the private cloud falls below a second threshold; and the second threshold is defined based on server usage rate and storage usage rate. The first threshold is higher than the second threshold.

In specific embodiments, the processor is configured to monitor a plurality of applications on one type of clouds as a migration source for the migration of the set of application and the data. The processor is configured to select for migration from a private cloud to a public cloud, among the plurality of applications, an application which is more dynamic than other applications of the plurality of applications. An application is more dynamic if at least one of the following conditions is met: (i) the application has a standard deviation of resource utilization which is larger than the other applications, (ii) the application has a growth ratio of resource utilization which is higher than the other applications, and (iii) the application has a remaining period which is shorter than the other applications.

In some embodiments, the applications being monitored include one or more batch applications having batch intervals and one or more online applications. The processor is configured to select for migration, from the plurality of applications, an application according to (i) whether the application is a batch application or an online application, (ii) the batch interval if the application is a batch application, and (iii) a type of threshold for migration based on resource utilization of the application including at least one of server usage rate or storage usage rate.

In specific embodiments, the application has a security requirement; and the processor is configured to select a target cloud meeting the security requirement to which to migrate the application. The application is a composite application comprised of multiple applications which access the data; and the processor is configured to migrate the set of the composite application and the data based on resource utilization of resources including at least one of the server or the storage system.

In accordance with another aspect of the invention, a system comprises: a storage system; and a computer including a memory and a processor. The processor is operable to manage two types of clouds, which are private and public clouds, by using information stored in the memory, and to manage a migration of a set of an application and a data between a first type of clouds and a second type of clouds of the two types of clouds, the application running on a server of the first type of clouds, the data to be read or written by the application and being stored in the storage system of the first type of clouds. The processor manages the migration of the set of the application and the data between the first type of clouds and the second type of clouds based on resource utilization of resources including at least one of the server or the storage system.

In some embodiments, the system further comprises the server of the first type of clouds on which the application runs.

Another aspect of this invention is directed to a computer-readable storage medium storing a plurality of instructions for controlling a data processor to manage migration among clouds. The plurality of instructions comprise: instructions that cause the data processor to manage two types of clouds, which are private and public clouds, by using information stored in a memory; and instructions that cause the data processor to manage a migration of a set of an application and a data between a first type of clouds and a second type of clouds of the two types of clouds, the application running on a server of the first type of clouds, the data to be read or written by the application and being stored in a storage system of the first type of clouds. The migration of the set of the application and the data between the first type of clouds and the second type of clouds is managed based on resource utilization of resources including at least one of the server or the storage system.

These and other features and advantages of the present invention will become apparent to those of ordinary skill in the art in view of the following detailed description of the specific embodiments.

BRIEF DESCRIPTION OF THE DRAWINGS

FIG. 1A shows an example of a logical view of the system according to the first embodiment.

FIG. 6 shows an example of a Configuration Information Table in the Management Server of FIG. 4 according to the first embodiment.

FIG. 7 shows an example of an Application Table in the Management Server of FIG. 4 according to the first embodiment.

FIG. 10 shows an example of a Configuration Information Table according to the second embodiment.

FIG. 11 shows an example of an Application Table according to the second embodiment.

FIG. 14 shows an example of the Job Schedule Table.

FIG. 16 shows an example of the Application Table according to the fourth embodiment.

DETAILED DESCRIPTION OF THE INVENTION

Figure 1:
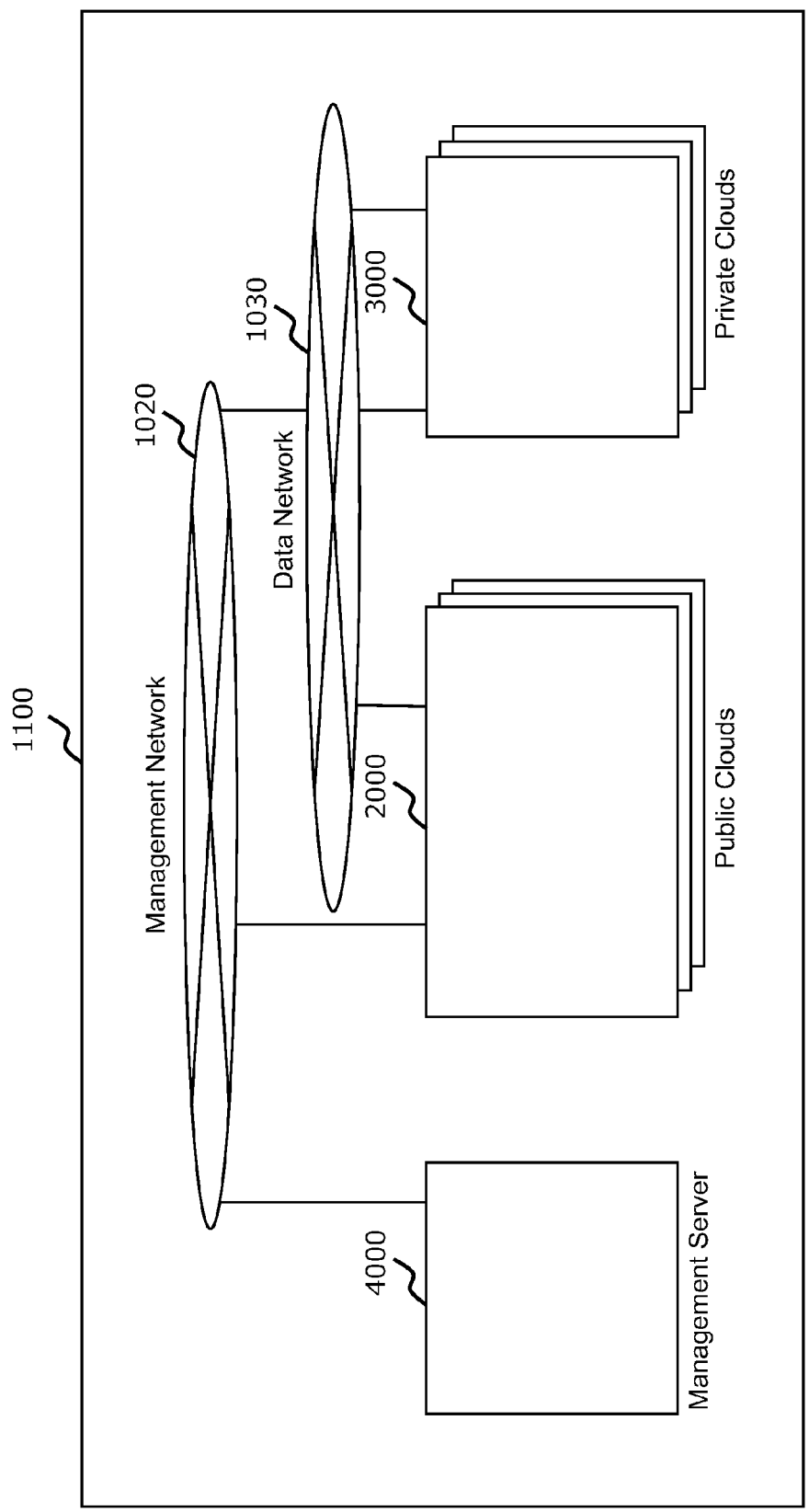
FIG. 1 shows an example of a Hybrid Cloud Environment according to the first embodiment of the present invention.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transient medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for improving and preferably maximizing the return on investment (ROI) in a hybrid cloud environment composed of private cloud and public cloud.

1. Embodiment 1

The first embodiment discloses how the enterprise who owns private clouds maximizes the ROI by using public cloud for peak or unexpected workload which cannot be executed in the private clouds. The basic strategy of this embodiment is to keep a high utilization ratio of private clouds as much as possible. Private clouds are owned by the enterprise, therefore they consumes owned cost regardless of whether private clouds are used. So, the enterprise should keep high utilization ratio of private clouds.

FIG. 1 shows an example of a Hybrid Cloud Environment according to the first embodiment of the present invention. A hybrid cloud 1100 includes public clouds 2000, private clouds 3000, and a management server 4000. FIG. 1 shows three public clouds and three private clouds, but the invention is not limited to these numbers of clouds. The public clouds 2000 and private clouds 3000 are connected via a Data Network 1030. This network is typically a WAN (Wide Area Network), but the invention is not limited to this. The public clouds 2000, private clouds 3000, and management server 4000 are connected via a management network 1020. This network is typically a WAN, but the invention is not limited to this. In the embodiment shown, the management network and data network are separate, but the invention is not limited to this. In addition, the management server 4000 and each cloud are separate, but the invention is not limited to this. For example, the management server can be located in one of the private clouds.

FIG. 1A shows an example of a logical view of the system according to the first embodiment. In the system 1501, each application uses a corresponding data store. In this environment, application AP_01 creates and stores data to data store DS_01 and application AP_02 creates and stores data to data store DS_02. Application AP_01 is executed on server SVR_01 1505 and Application AP_02 is executed on server SVR_02 1510. Server is not limited to physical server. Virtual server may be used. Data store is not limited to DAS (Direct Attached Storage), NAS (Network Attached Storage), and SAN (Storage Area Network). Any kind of data store can be used. The application and the corresponding data store are on the same type of clouds. For example, they may be on the same private cloud or on different private clouds, and they may be migrated to the same public cloud or to different public clouds.

Figure 2:
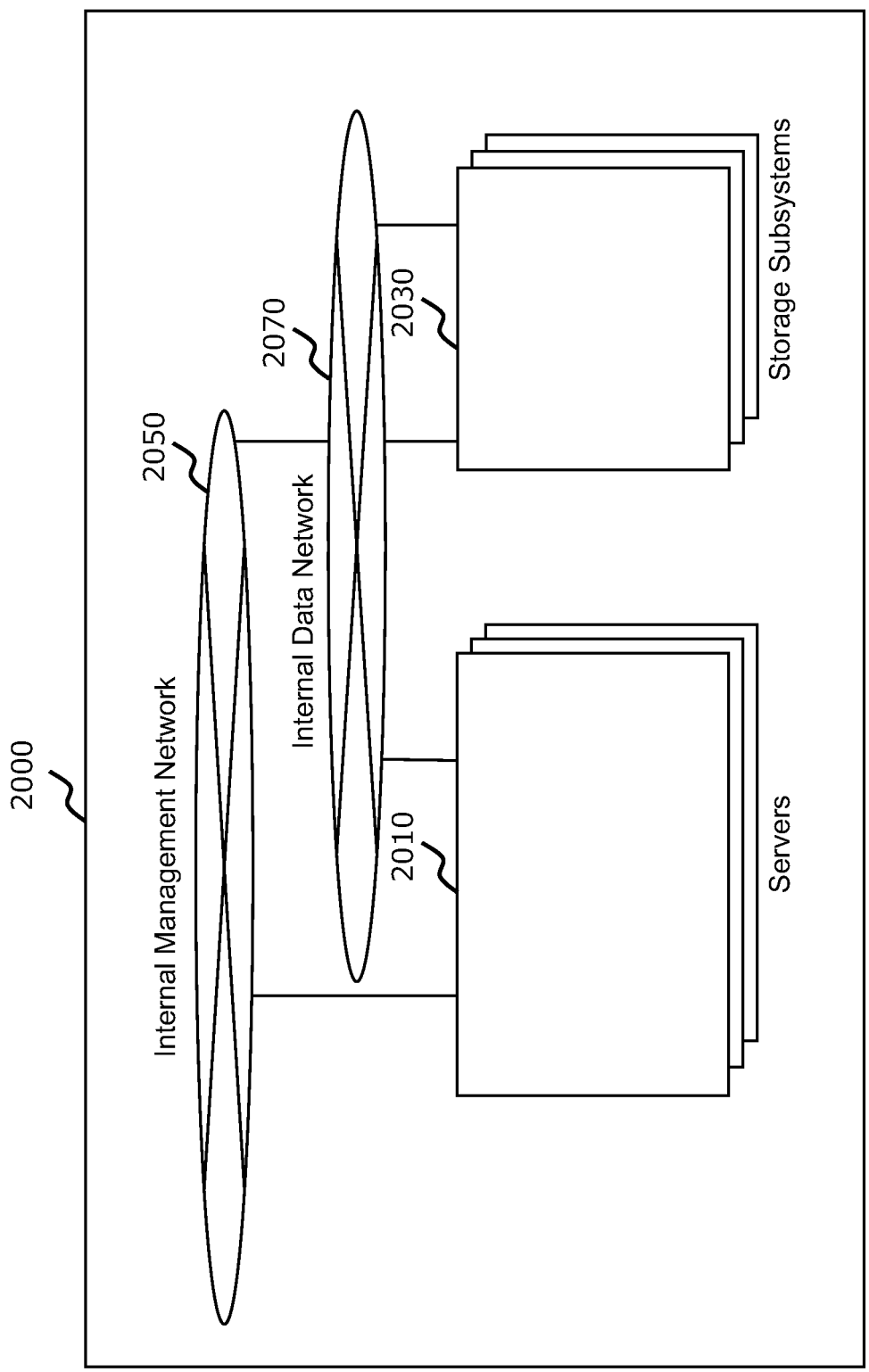
FIG. 2 shows an example of the configuration of a Public Cloud according to the first embodiment.

FIG. 2 shows an example of the configuration of a Public Cloud according to the first embodiment. The public cloud 2000 includes servers 2010 and storage subsystems 2030 which are connected via an internal data network 2070. This network is typically a SAN, but the invention is not limited to this. The servers 2010 and storage subsystems 2030 are connected via an internal management network 2050. This network is typically a LAN (Local Area Network), but the invention is not limited to this. FIG. 2 shows three servers 2010 and three storage subsystems 2030, but the invention is not limited to these numbers. The servers 2010 and storage subsystems 2030 are separate in FIG. 2, but the invention is not limited to this. For example, the servers 2010 can have DAS and the storage subsystems 2030 can be eliminated.

Figure 3:
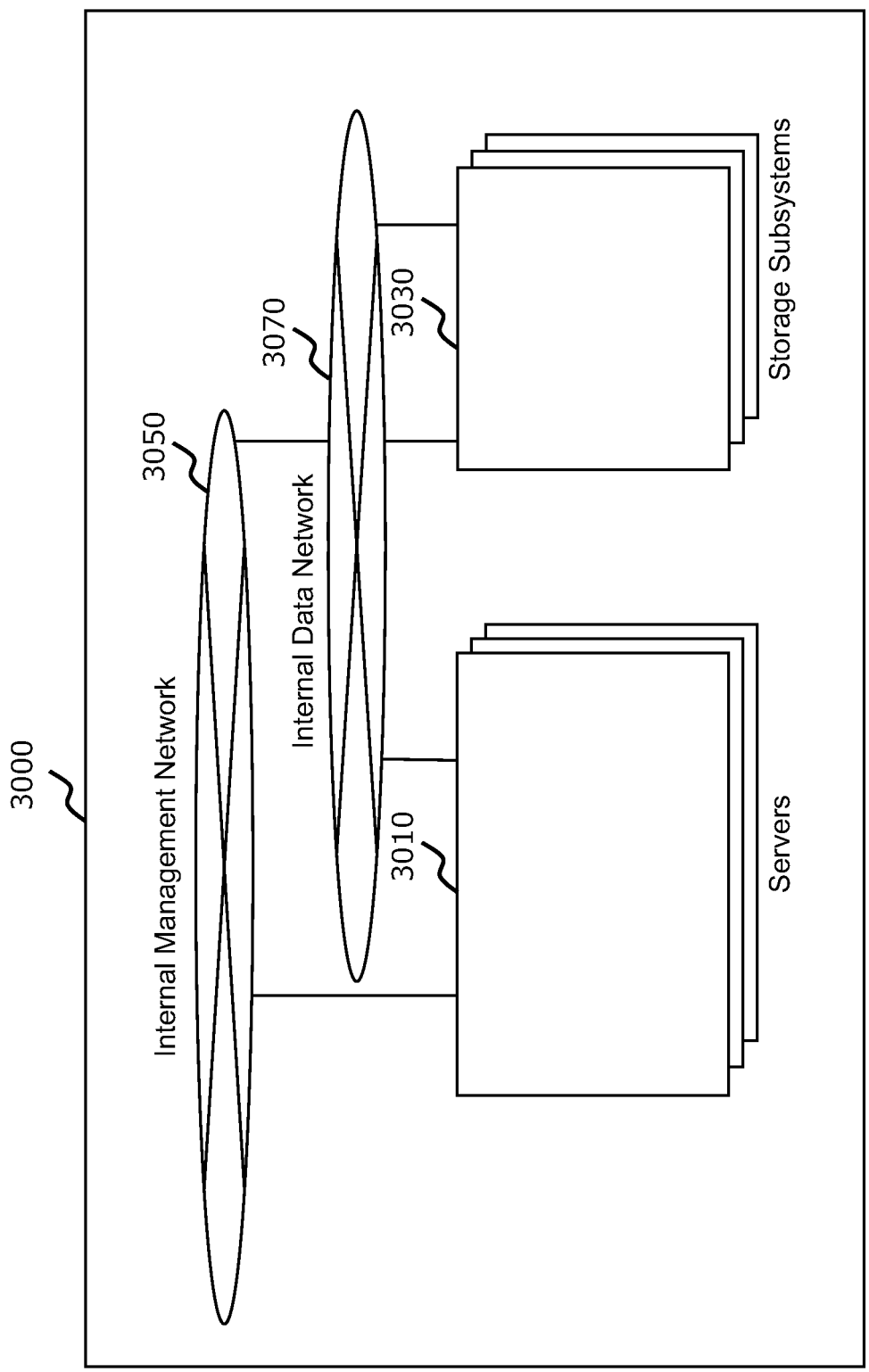
FIG. 3 shows an example of the configuration of a Private Cloud.

FIG. 3 shows an example of the configuration of a Private Cloud. The Private cloud 3000 includes servers 3010 and storage subsystems 3030, which are connected via an internal data network 3070. This network is typically a SAN (Storage Area Network), but the invention is not limited to this. The servers 3010 and storage subsystems 3030 are connected via an internal management network 3050. This network is typically a LAN (Local Area Network), but the invention is not limited to this. FIG. 3 shows three servers 3010 and three storage subsystems 3030, but the invention is not limited to these numbers. The servers 3010 and storage subsystems 3030 are separate, but the invention is not limited to this. For example, the servers 3010 can have DAS (Direct Attached Storage) and the storage subsystems 3030 can be eliminated.

Figure 4:
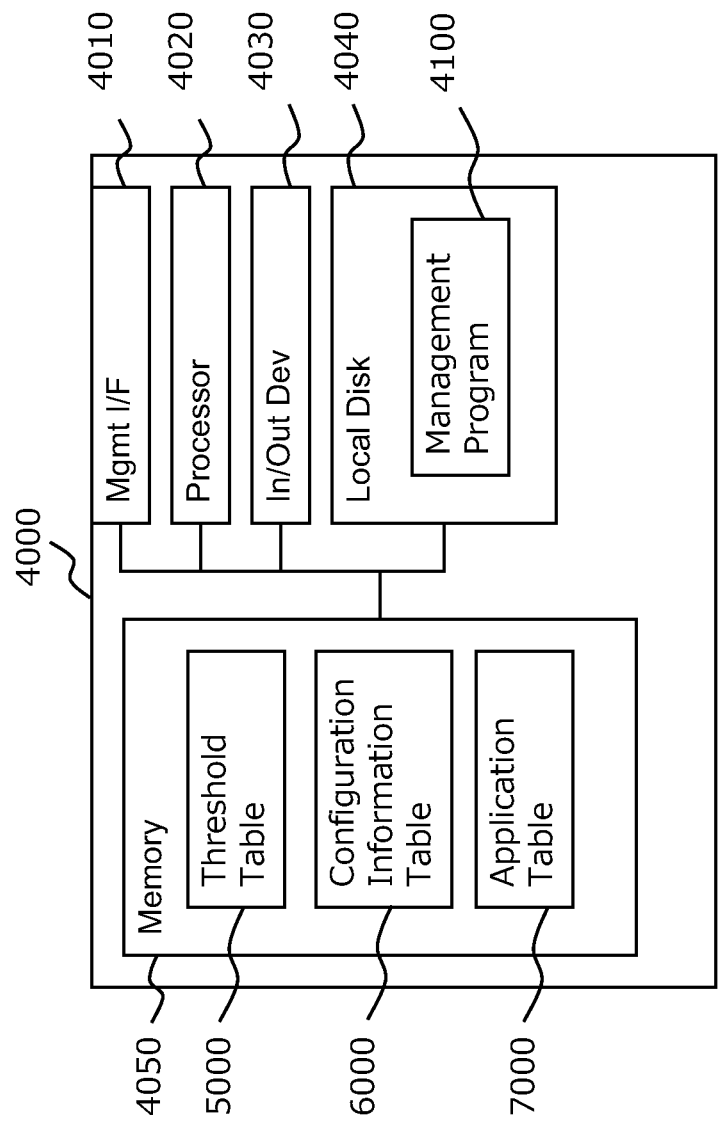
FIG. 4 shows an example of the configuration of a Management Server according to the first embodiment.

FIG. 4 shows an example of the configuration of a Management Server according to the first embodiment. This figure shows the management server 4000 which exists in the hybrid cloud environment 1100 of FIG. 1. The management server 4000 includes a management interface 4010, a processor 4020, an input/output device 4030, a local disk 4040, and a memory 4050. The Management Interface 4010 is an interface to the Management Network 1020 of FIG. 1. The Input/Output Device 4030 is a user interface such as monitor, keyboard, and/or mouse. The Local Disk 4040 contains a Management Program 4100. The Management Program 4100 is loaded to the Memory 4050 and executed by the Processor 4020. The procedure of the Management Program 4100 is disclosed later using FIG. 8. The Memory 4050 contains a threshold table 5000, a configuration information table 6000 and an application table 7000. Each table is described later.

Figure 5:
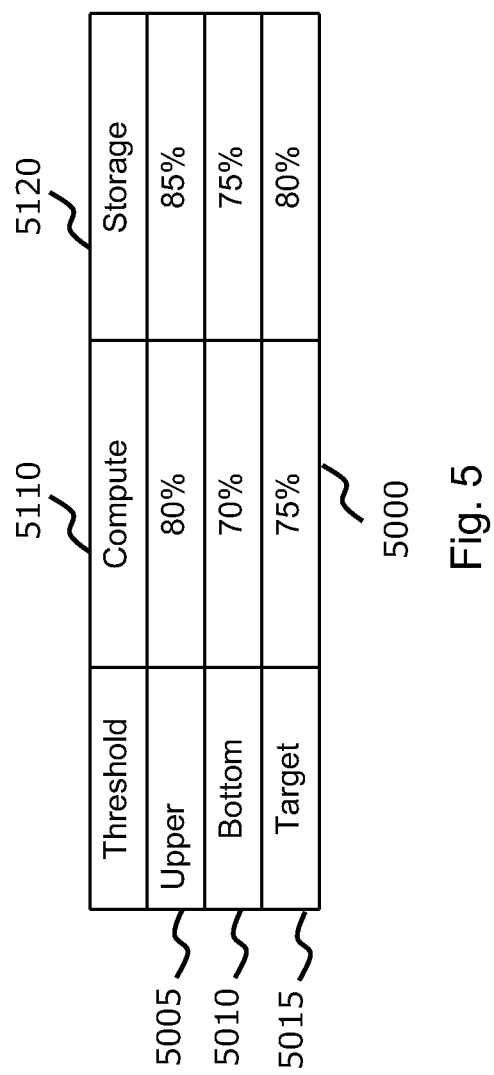
FIG. 5 shows an example of a Threshold Table in the Management Server of FIG. 4.

FIG. 5 shows an example of a Threshold Table in the Management Server 4000 of FIG. 4. In the threshold table 5000, each column shows the upper threshold and bottom threshold of a resource. Row 5005 defines the upper threshold, row 5010 defines the bottom threshold, and row 5015 defines the target ratio. Column 5110 shows the threshold of the compute resource. The upper threshold is 80%, the bottom threshold is 70%, and the target ratio is 75%. Column 5120 shows the threshold of the storage resource. The upper threshold is 85%, the bottom threshold is 75%, and the target ratio is 80%. These values represent one example and do not limit the invention. In the example shown, the threshold of the compute and the threshold of the storage are different, but it is possible to set the same threshold.

FIG. 6 shows an example of a Configuration Information Table in the Management Server 4000 of FIG. 4 according to the first embodiment. In the configuration information table 6000, column 6105 shows the identification of the cloud. Column 6110 shows the type of the cloud, which is public or private. Column 6115 shows the initial cost of the cloud. The initial cost of a public cloud is typically 0. Column 6200 shows the compute resource information of the cloud. It has three columns 6205, 6210, and 6215. Column 6205 shows the unit utilization cost of the compute resource. Column 6210 shows the total amount of the compute resource. Column 6215 shows the used amount of the compute resource. Column 6300 shows the storage resource information of the cloud. It has three columns 6305, 6310, and 6315. Column 6305 shows the unit utilization cost of the storage resource. Column 6310 shows the total amount of the storage resource. Column 6315 shows the used amount of the storage resource.

Each row shows configuration information of a cloud. For example, row 6005 shows the configuration information of cloud Private_A. This is a private cloud and the initial cost is 1500. The unit utilization cost of this compute resource is 1.2. The total compute amount is 500 and 300 is already used. The unit utilization cost of this storage resource is 1.5. The total storage amount is 600 and 450 is already used. Usually, the resource amount of the public cloud is unlimited for the user perspective. Therefore, the total amount of each resource of the public cloud is unlimited.

FIG. 7 shows an example of an Application Table in the Management Server 4000 of FIG. 4 according to the first embodiment. The application table 7000 shows the application information and history of resource consumption of the application. Row 7005 shows the identification of the application. Row 7010 shows the location of the application. This shows the identification of the cloud in which the application is deployed. Row 7020 shows the remaining days of the application. If the remaining days become 0, this application will be undeployed. For some applications, the remaining period can be set in advance and the valid remaining period is set in this field. For other applications, the remaining period cannot be set in advance and the remaining period is "Unknown."

Rows 7050 (7052, 7054, 7056, etc.) show the history of compute resource consumption. Row 7052 shows the latest compute resource consumption. Row 7054 shows the second latest compute resource consumption. Row 7054 shows the third latest compute resource consumption. In this embodiment, Rows 7050 have 30 histories of compute resource consumption, but the invention is not limited to this number. Rows 7070 (7072, 7074, 7076, etc.) show the history of storage resource consumption. Row 7072 shows the latest storage resource consumption. Row 7074 shows the second latest storage resource consumption. Row 7074 shows the third latest storage resource consumption. In this embodiment, Rows 7070 have 30 histories of storage resource consumption, but the invention is not limited to this number.

Each column (7105, 7110, 7115, etc.) shows application information. For example, column 7105 shows the information of an application AP_01. This application is deployed on the cloud Private_A. The remaining period of this application is 5 days. The latest compute resource consumption is 18 and the storage resource consumption is 26.

Figure 8:
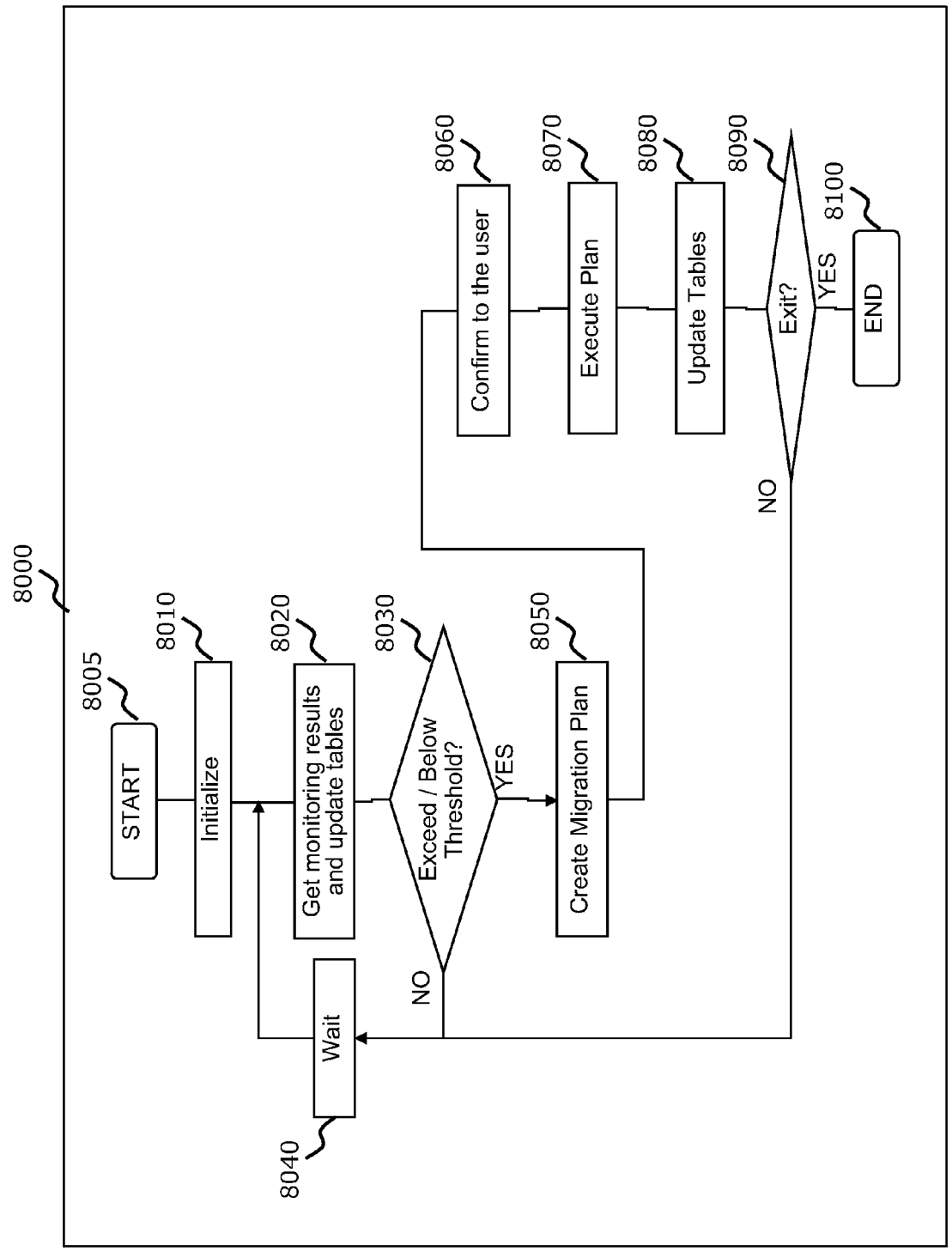
FIG. 8 shows an example of a flow diagram illustrating the process of a management program according to the first embodiment.

FIG. 8 shows an example of a flow diagram illustrating the process of a management program 8000 according to the first embodiment, which is the management program 4100 in the management server 4000 of FIG. 4. The program starts at step 8005. In step 8010, when the management program 4100 is loaded from the local disk 4040 to the memory 4050, the threshold table 5000, configuration Information table 6000, and application table 7000 are created in the memory 4050. For the threshold table, the default (preset) value can be used for the threshold table or the user can set each threshold. For the configuration information table, information of the configuration information table is acquired from each cloud. For this, an agent can be placed in each cloud or the management server 4100 can use API if a cloud provides API for this purpose. For the application table, information of the application table is acquired from each application. For this, an agent can be placed in each cloud or the management server 4100 can use API if each application provides API for this purpose.

In step 8020, the program gets monitoring results from each cloud and application and updates the tables. For the configuration information table, the program updates the used amount column of compute and storage in each cloud. For the application table: (1) if an application is undeployed, the corresponding application column is deleted; (2) the program updates the Remaining Period row if required; and (3) the program updates histories of compute and storage resource consumption of each application.

In step 8030, the program checks whether a private cloud whose resource utilization exceeds its threshold exists. If yes, the program goes to step 8050; if no, the program proceeds to step 8040. In step 8040, the program waits for a while and then goes to step 8020.

In step 8050, the program creates a migration plan. The basic strategy of this embodiment is to keep a high utilization ratio of private clouds as much as possible. How to create a plan depends on the threshold type, but the basic procedure is described as follows. In step 8050-(1), the program decides the application sets for a candidate. If the resource utilization of the private cloud exceeds the upper threshold, the application sets for candidate are applications executed on the private cloud. If the resource utilization of the private cloud falls below the bottom threshold, the application sets for candidate are applications executed on the public clouds. In step 8050-(2), the program calculates the evaluated value of each application. In step 8050-(3), the program sorts applications in descending order based on the evaluated value. In step 8050-(4), the program selects applications from the beginning until the utilization ratio of the private cloud exceeds or falls below the target ratio. In this example, the target ratio to exceed and the target ratio to fall below are the same, but the invention is not limited to this. It is possible to set different target ratios to exceed and fall below. Step 8050-(2) depends of the type of the threshold, as illustrated in the three cases below.

In the first case where the compute resource utilization exceeds the upper threshold, the evaluated value $e_i$ for each application $c_i$ is calculated as follows:

$$e_i = \frac{c_{ip_\alpha}^p}{c_{ip_\alpha}^d} \times \alpha_1 + \sigma(c_{ip_\alpha}^p) \times \beta_1$$

where, $c_{ip_\alpha}^P$ is a maximum compute resource utilization of an application $c_i$ among period $p_\alpha$, $c_{ip_\alpha}^d$ is a maximum storage resource utilization of an application $c_i$ among period $p_\alpha$, $\sigma(c_{ip_\alpha}^P)$ is a standard deviation of compute resource utilization of an application $c_i$ among period $p_\alpha$, $\alpha_1$ and $\beta_1$ are arbitrary constant values, and period $p_s$ is an arbitrary period below that stored in the application table 7000. In this example, the period is 30 histories, but the invention is not limited to this number.

In the second case where the storage resource utilization exceeds the upper threshold, the evaluated value $e_i$ for each application $c_i$ is calculated as follows:

$$e_i = c_{ip_t}^{d_{gr} \times \alpha_2} + \sigma(c_{ip_t}^P) \times \beta_2$$

where, $c_{ip_t}^{d_{gr}}$ is a storage resource growth rate of an application $c_i$ among period $p_b$, $\sigma(c_{ip_t}^P)$ is a standard deviation of compute resource utilization of an application $c_i$ among period $p_b$, $\alpha_2$ and $\beta_2$ are arbitrary constant values, and period $p_b$ is an arbitrary period below that stored in the application table 7000. In this example, this period is 30 histories, but the invention is not limited to this number.

In the third case where the compute resource utilization or storage resource utilization falls below the bottom threshold, the evaluated value $e_i$ for each application $c_i$ is calculated as follows:

$$e_i = \frac{1}{c_{ip_c}^{d_{gr}}} \times \alpha_3 + \frac{1}{\sigma(c_{ip_c}^P)} \times \beta_3 + \frac{1}{c_i^{tr}} \times \gamma_3$$

where, $c_{ip_2}^{d_{gr}}$ is a storage resource growth rate of an application $c_i$ among period $p_c$, $\sigma(c_{ip_2}^P)$ is a standard deviation of compute resource utilization of an application $c_i$ among period $p_c$, $c_i^{tr}$ is a remaining period of an application $\alpha_3$, $\beta_3$ and $\gamma_3$ are arbitrary constant values, and period $p_c$ is an arbitrary period below that stored in the application table 7000.

In this example, this period is 30 histories, but the invention is not limited to this number.

In step 8060, the program provides the created plan to the user. The user can select immediate execution or scheduled execution. If scheduled execution is specified, the program registers the plan to the scheduler. In step 8070, the program executes the created plan. In step 8080, the configuration will change based on the migration. Therefore, the configuration information table 6000 and application table 7000 are updated. In step 8090, the program checks whether there is termination indication by the user. If termination indication exists, the program goes to step 8100; otherwise, it goes to step 8040. The process ends at step 8100.

Figure 9:
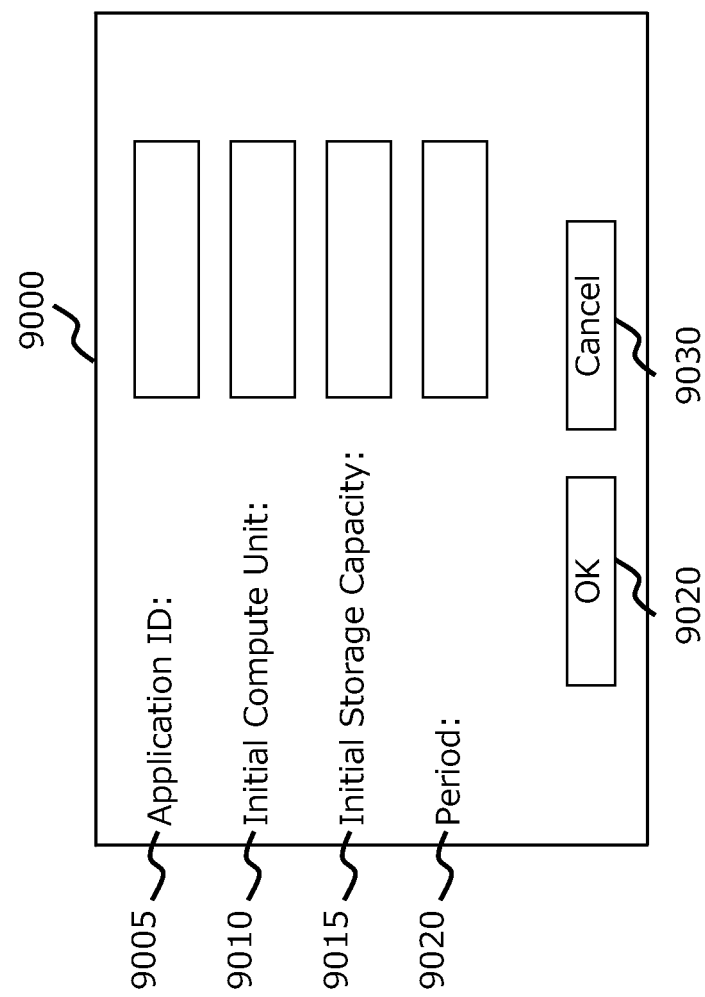
FIG. 9 shows an example of a self service provisioning GUI in the Management Server of FIG. 4 according to the first embodiment.

FIG. 9 shows an example of a self service provisioning GUI 9000 in the Management Server 4000 of FIG. 4 according to the first embodiment. This GUI is used when a user wants to provision IT resources. The user inputs an identification of an application into the Application ID field 9005, initial compute unit into the Initial Compute Unit field 9010, and initial storage capacity into the Initial Storage Capacity field 9015. Additionally, if the user can specify the period at this time, he/she inputs the period of use into the Period field 9020. If the Cancel button 9030 is pressed, the provisioning process is canceled. If the OK button is pressed, the management program 4100 executes the following procedure.

First, the management program 4100 decides the provisioning target. If the utilization ratio of the private cloud is below bottom threshold, provisioning target is private cloud. Otherwise, provisioning target is public cloud. If there are multiple public clouds, the program selects the cheapest cloud for the provisioning workload. Second, the management program provisions IT resources from the selected cloud. Third, the management program adds a new column to the application table 7000. The identification of the application is set to the Application ID 7005 and the identification of the provisioned cloud is set to the Location field 7010. If the period is specified, specified period is set to the Period field 7020. Otherwise, Unknown is set. Also, target cloud of the provisioning can be specified by the user. If the private cloud is specified and the resource utilization of the private cloud exceeds the upper threshold, an error message is displayed.

In this embodiment, an enterprise can maximizes the ROI for IT investment when utilizing a hybrid cloud environment composed of private cloud and private cloud by executing following procedure. When the resource utilization ratio of the private cloud exceeds the threshold, more dynamic applications are migrated to the public cloud. "More dynamic" means, for example, an application whose standard deviation of resource utilization is large, an application whose growth ratio of resource utilization is high, and an application whose remaining period is short. Otherwise, when the resource utilization ratio of the private cloud falls below the threshold, more stable applications are migrated to the private cloud.

2. Embodiment 2

In some cases, an application has security requirements. As such, the application has to be executed on the cloud that satisfies the security requirements. In the second embodiment, the method to satisfy security requirements is disclosed. The procedure of the second embodiment is almost the same as that of the first embodiment. Therefore, only the differences are described. The system configuration is same as that for the first embodiment (FIGS. 1-3).

FIG. 10 shows an example of a Configuration Information Table according to the second embodiment. This configuration information table 6002 differs from the configuration information table 6000 of the first embodiment shown in FIG. 6 in that it has an additional Security Level column 10005. This column shows the security level of the cloud. For example, the security level of the Private_A cloud is 5. In this example, the security level is defined with five steps from 1 to 5, but the invention is not limited to this.

FIG. 11 shows an example of an Application Table according to the second embodiment. This application table 7002 differs from the application table 7000 of the first embodiment shown in FIG. 7 in that it has an additional Security level row 11005. This row shows the security level of the application. For example, the security level of the AP_03 application is 4. In this example, the security level is defined with five steps from 1 to 5, but the invention is not limited to this.

The flow diagram of the process of the management server is almost same as that of the first embodiment shown in FIG. 8, but the following step is different. In step 8050-(4), the program selects applications from the beginning until the utilization ratio of private cloud exceeds or falls below the target ratio, as in the first embodiment. However, if the security level of the selected application is higher than the security level of the target cloud, this application is eliminated.

Figure 12:
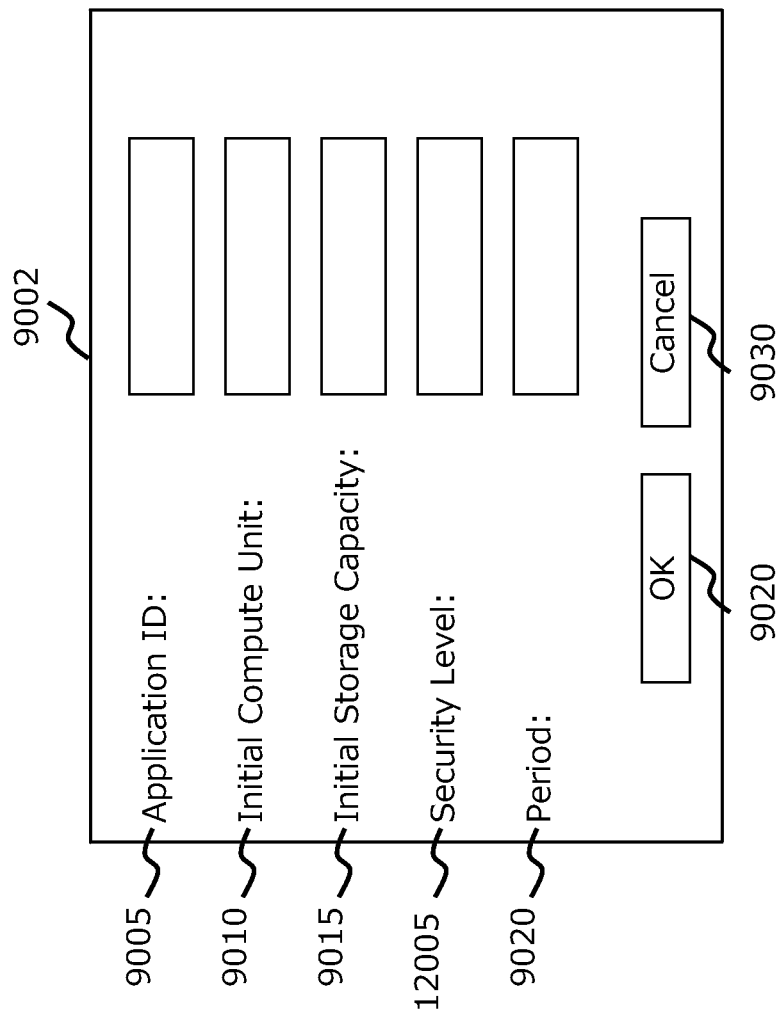
FIG. 12 shows an example of a self service provisioning GUI according to the second embodiment.

FIG. 12 shows an example of a self service provisioning GUI according to the second embodiment. This self service provisioning GUI 9002 of the management server 4000 differs from the self service provisioning GUI 9000 of the first embodiment shown in FIG. 9 in that it has an additional "Security Level' field 12005. The user inputs a security level of the application into this field and this value is set to the security level row 11005 of the application table 7002. When the management program decides the provisioning target, a cloud whose security level is higher than the security level of the application can be the target.

In the second embodiment, an enterprise can maximizes the ROI for IT investment when utilizing a hybrid cloud environment composed of private cloud and private cloud even if the application has a security level.

3. Embodiment 3

Applications are divided into two types. One is an online application which is executed steadily and the other is a batch application which is executed on a periodic basis. The third embodiment is directed to a method to address application types. The procedure of the third embodiment is almost the same as that of the first embodiment. Therefore, only the differences are described. The system configuration is same as that of the first embodiment (FIGS. 1-3).

Figure 13:
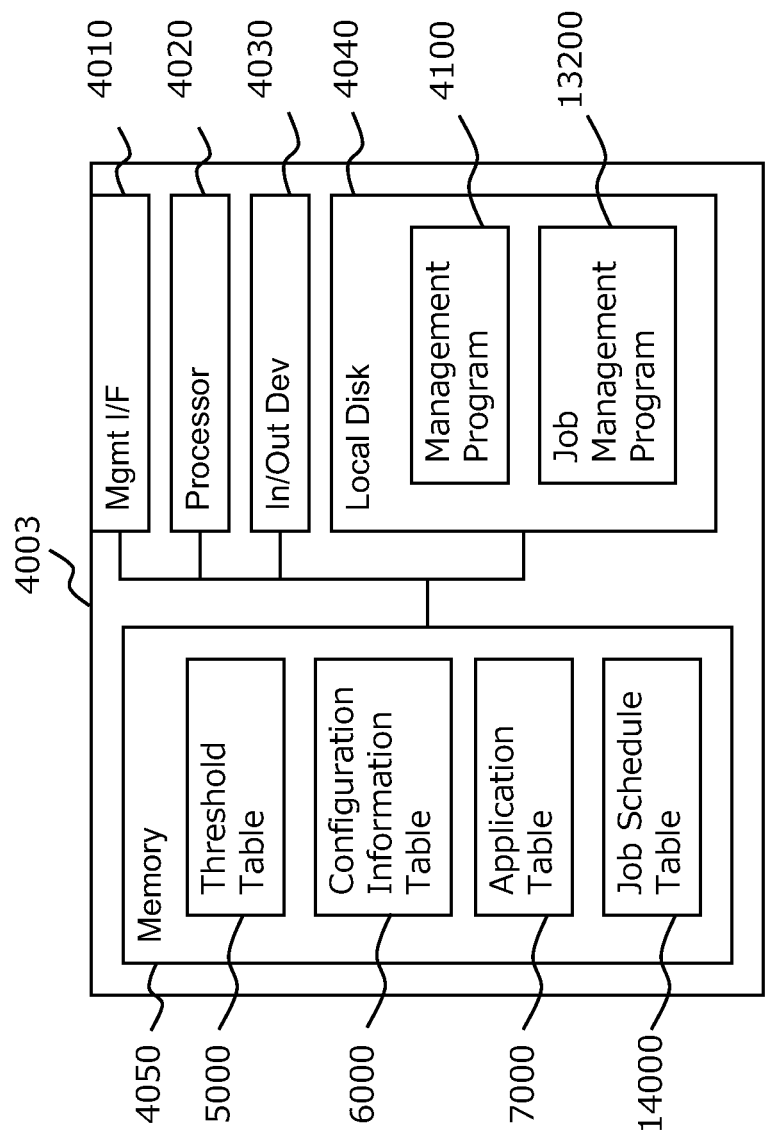
FIG. 13 shows an example of the configuration of the Management Server according to the third embodiment.

FIG. 13 shows an example of the configuration of the Management Server according to the third embodiment. This management server 4003 in the hybrid cloud environment 1100 differs from the management server 4000 of the first embodiment shown in FIG. 4 in that it includes a Job Management Program 13200 and a Job Schedule Table 14000.

The Job Management Program 13200 manages the Job Schedule Table 14000. It means to create, modify, and delete the table, and to execute applications based on the table.

Job Schedule Table 14000 is disclosed later using FIG. 14.

FIG. 14 shows an example of the Job Schedule Table 14000. This table shows the job execution schedule for each batch application. Row 14010 shows the running interval of the batch job. In this example, the value of this field is one of Daily, Weekly, or Monthly, but the invention is not limited to this. Row 14020 shows the start time of the batch application. Each column (14105, 14110, 14115, etc.) shows the batch application information. For example, column 14105 shows the information of batch application AP_01. This application is executed at 2:00 every day.

The flow diagram of the process of the management server is almost the same as that of the first embodiment shown in FIG. 8. The following step is different. Step 8050-(2) is divided into the following two steps. In step 8050-(2-1), the program decides the batch evaluate value $b_{c_i}^j$, for each application $c_i$. If an application $c_i$ is not a batch application, this value is $b_{c_i}^1$. If an application $c_i$ is a batch application and the interval is daily, this value is $b_{c_i}^2$. If an application $c_i$ is a batch application and the interval is weekly, this value is $b_{c_i}^3$. If an application $c_i$ is a batch application and the interval is monthly, this value is $b_{c_i}^4$. Here, $b_{c_i}^1 < b_{c_i}^2 < b_{c_i}^3 < b_{c_i}^4$. Step 8050-(2-2) depends on the type of the threshold as described below.

In the first case where the compute resource utilization exceeds the upper threshold, the evaluated value $e_i$ for each application $c_i$ is calculated as follows:

$$e_i = \frac{c_{ip_\alpha}^p}{c_{ip_\alpha}^d} \times \alpha_1 + \sigma(c_{ip_\alpha}^p) \times \beta_1 + b_{c_i}^j$$

where, $c_{ip_1}^p$ is a maximum compute resource utilization of an application $c_i$ among period $p_\alpha$, $c_{ip_2}^d$ is a maximum storage resource utilization of an application $c_i$ among period $p_\alpha$, $\sigma(c_{ip_\alpha}^p)$ is a standard deviation of compute resource utilization of an application $c_i$ among period $p_\alpha$, $b_{c_i}^j$ is a batch evaluate value of an application $c_i$, $\alpha_1$ and $\beta_1$ are arbitrary constant values, and period $p_\alpha$ is an arbitrary period below that stored in the application table 7000.

In this example, this period is 30 histories, but the invention is not limited to this number.

In the second case where the storage resource utilization exceeds the upper threshold, the evaluated value $e_i$ for each application $c_i$ is calculated as follows:

$$e_i = c_{ip_c}^{d_{gr} \times \alpha_2} + \sigma(c_{ip_c}^p) \times \beta_2 + b_{c_i}^j$$

where, $c_{ip_t}^{d_{gr}}$ is a storage resource growth rate of an application $c_i$ among period $p_b$, $\sigma(c_{ip_t}^p)$ is a standard deviation of compute resource utilization of an application $c_i$ among period $p_b$, $b_{c_i}^j$ is a batch evaluate value of an application $c_i$, $\alpha_2$ and $p_b$ are arbitrary constant values, and period $p_b$ is an arbitrary period below that stored in application table 7000. In this example, this period is 30 histories, but the invention is not limited to this number.

In the third case where the compute resource utilization or storage resource utilization falls below the bottom threshold, the evaluated value $e_i$ for each application $c_i$ is calculated as follows:

$$e_i = \frac{1}{c_{ip_e}^{dgr}} \times \alpha_3 + \frac{1}{\sigma(c_{ip_e}^p)} \times \beta_3 + \frac{1}{c_i^{tr}} \times \gamma_3 + \frac{1}{b_{c_i}^j}$$

where,
$c_{ip_e}^{dgr}$ is a storage resource growth rate of an application $c_i$ among period $p_c$,
$\sigma(c_{ip_e}^p)$ is a standard deviation of compute resource utilization of an application among period $p_c$,
$c_i^{tr}$ is a remaining period of an application $c_i$,
$b_{c_i}^j$ is a batch evaluate value of an application $c_i$,
$\alpha_2$, $\beta_2$, and $\gamma_3$ are arbitrary constant values, and
period $p_c$ is an arbitrary period below that stored in the application table 7000. In this example, this period is 30 histories, but the invention is not limited to this number.

The longer interval of an application means the longer the idle time. Therefore, those applications should be executed in a public cloud whose accounting model is pay-as-you-go.

In this embodiment, an enterprise can maximizes the ROI for IT investment when utilizing a hybrid cloud environment composed of private cloud and private cloud even if the batch applications and online applications are executed.

4. Embodiment 4

In some cases, a composite application is used. A composite application is an application built by combining multiple existing applications. There are multiple forms of the composite application. For example, an online application AP_01 creates and stores data to data store DS_01 and a batch application AP_02 analyzes it periodically.

Figure 15:
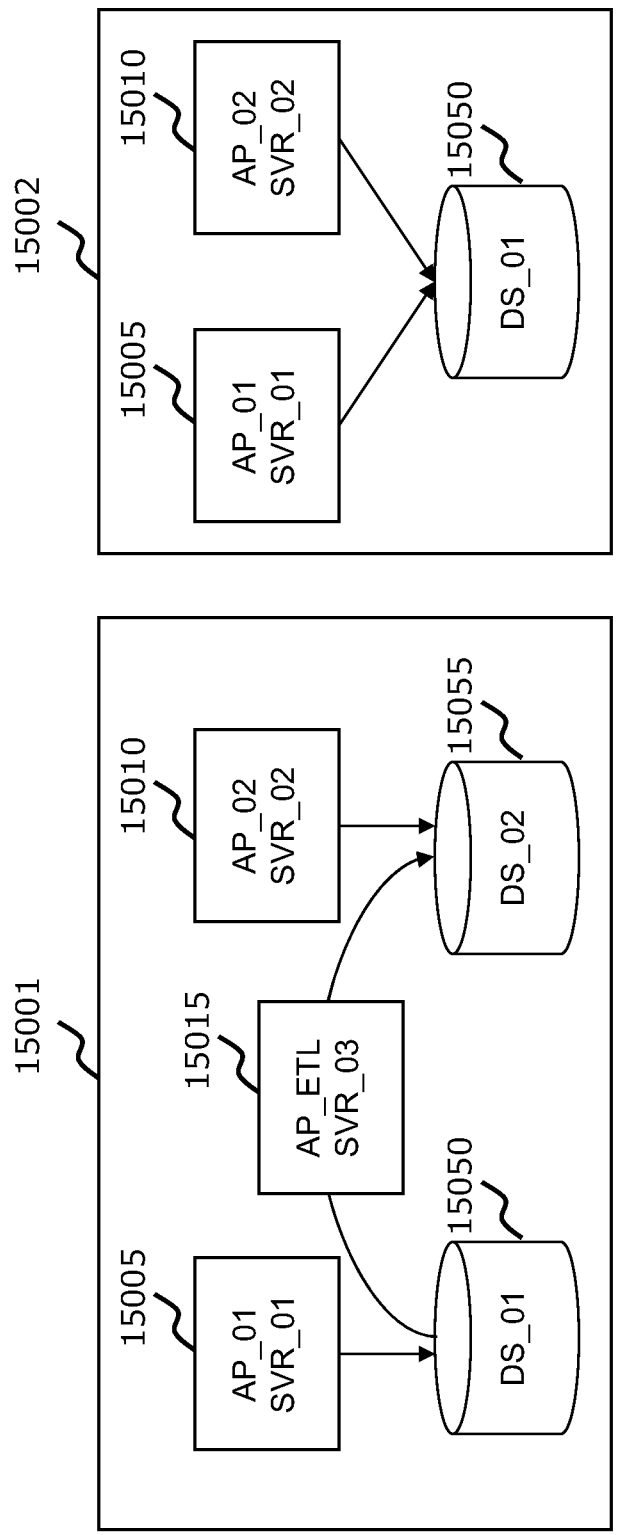
FIG. 15 shows an example of a Logical View of the system according to the fourth embodiment.

FIG. 15 shows an example of a Logical View of the system according to the fourth embodiment. This figure shows the logical view of the system 15001 and system 15002. Two patterns should be considered as a composite application.

The logical view 15001 shows that one application uses multiple data stores. In this environment, online application AP_01 creates and stores data to data store DS_01. Then, ETL (Extract/Transform/Load) application AP_ETL reads data from data store DS_01 and writes data to data store DS_02. Finally, batch application AP_02 analyzes it periodically using data store DS_02. Application AP_01 is executed on server SVR_01 15005, Application AP_02 is executed on server SVR_02 15010, and Application AP_ETL is executed on server SVR_03 15015. Server is not limited to physical server. Virtual server may be used. Data store is not limited to DAS, NAS, and SAN. Any kind of data store can be used.

The logical view 15002 shows that multiple applications share one data store. In this environment, online application AP_01 creates and stores data to data store DS_01, and batch application AP_02 analyzes periodically using data store DS_01.

FIG. 16 shows an example of the Application Table according to the fourth embodiment. This application table 7004 differs from the application table 7002 of the second embodiment shown in FIG. 11 in that it includes additional server row 16005 and data store row 16010. Server row 16005 shows the server identification in which the application is deployed. Data store row 16010 shows the data store identification(s) that the application uses.

The flow diagram of the process of the management server is almost same as that of the second embodiment, but the following steps are different. In step 8010, the management program 4100 acquires server identification and data store identification of each application from each cloud and each application. Then the information is added to the application table 7004. In step 8020, if update such as migration occurs, the management program 4100 updates the application table 7004 including server row 16005 and data store row 16010. In step 8050, the program treats the composite application as one application. If the applications share one data store, such applications are treated as one application. If some application uses multiple data stores, applications that use those data stores are treated as one application.

For example, the management server can decide AP_01, AP_02 and AP_ETL are the composite application by looking up the Server field 16005 and the Data Store field 16010 of the Application Table 7004. In this case, this composite application uses DR_01 and DR_02 as a storage resource, and SVR_01, SVR_02, and SVR_03 as a server resource. Resource utilization of the composite application can be decided by the following procedure. For example, the management server can get the resource utilization at time period 2 by looking up the row 7056 and the row 7076 of the Application Table 7004. The management server can solve the resource utilization by calculating the sum of each server utilization and storage utilization. Server utilization of this composite application is 61 (16+3+42) and storage utilization of this composite application is 189 (50+17+122). In this embodiment, management server can decide the resource utilization by calculating the sum of each server utilization and storage utilization, but the invention is not limited to this. For example, if the some storage area is shared by multiple applications of one composite application, and the management server can detect the amount of the shared area, the management server can exclude the shared area.

A composite application is treated as one application in the fourth embodiment, but the invention is not limited to this. For example, each application of the composite application may be placed in a different cloud. The logical environment (1) 15001 is referred to as an example. The management program 4100 monitors read data amount from DS_01 and writes data amount to DS_02. If the write data amount to DS_02 is less than the read data amount from DS_01, online application AP_01 and ETL application AP_ETL may be placed in the private cloud and batch application which is executed periodically may be placed in the public cloud.

In this embodiment, an enterprise can maximizes the ROI for IT investment when utilizing a hybrid cloud environment composed of private cloud and private cloud even if a composite application exists.

Of course, the system configuration illustrated in FIGS. 1-3 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for improving and preferably maximizing the ROI in a hybrid cloud environment. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A computer comprising:
a memory; and
a processor being operable to manage two types of clouds, which are private and public clouds, by using information stored in the memory, and to manage a migration of a set of an application and a data between a first type of clouds which are private clouds and a second type of clouds which are public clouds, the application running on a server of the first type of clouds, the data to be read or written by the application and being stored in a storage system of the first type of clouds;
wherein the processor manages the migration of the set of the application and the data between the first type of clouds and the second type of clouds based on resource utilization of resources including at least one of the server or the storage system so as to keep a high utilization ratio of the first type of clouds as compared to the second type of clouds;
wherein the processor is configured to migrate the set of the application and the data, from the first type of clouds including one or more private clouds to the second type of clouds including one or more public clouds, when the resource utilization of the first type of clouds exceeds a first threshold, so as to keep a high utilization ratio of the first type of clouds until the first threshold is exceeded, without regard to a utilization ratio of the second type of clouds;
wherein the first threshold is defined based on at least one of server usage rate or storage usage rate;
wherein the processor is configured to monitor a plurality of applications on one type of clouds as a migration source for the migration of the set of application and the data;
wherein the processor is configured to select for migration from a private cloud to a public cloud, among the plurality of applications, an application which is more dynamic than other applications of the plurality of applications when the resource utilization of the private cloud exceeds the first threshold; and
wherein an application is more dynamic if at least one of the following conditions is met: (i) the application has a standard deviation of resource utilization which is larger than the other applications, (ii) the application has a growth ratio of resource utilization which is higher than the other applications, and (iii) the application has a remaining period which is shorter than the other applications.

2. The computer according to claim 1,
wherein the first threshold is defined based on both the server usage rate and the storage usage rate.

3. The computer according to claim 1,
wherein the processor is configured to migrate the set of the application and the data, which was migrated from the first type of clouds including one or more private clouds to the second type of clouds including one or more public clouds when the resource utilization of the first type of clouds exceeded the first threshold, from the second type of clouds including one or more public clouds to the first type of clouds including one or more private clouds, when the resource utilization of the first type of clouds falls below a second threshold, so as to keep a high utilization ratio of the first type of clouds; and
wherein the second threshold is defined based on at least one of server usage rate or storage usage rate.

4. The computer according to claim 3,
wherein the second threshold is defined based on both the server usage rate and the storage usage rate.

5. The computer according to claim 3,
wherein the first threshold is higher than the second threshold.

6. The computer according to claim 1,
wherein the processor is configured to migrate the set of the application and the data, which was migrated from the first type of clouds including one or more private clouds to the second type of clouds including one or more public clouds when the resource utilization of the first type of clouds exceeded the first threshold, from the second type of clouds including one or more public clouds to the first type of clouds including one or more private clouds, when the resource utilization of the first type of clouds falls below a second threshold, so as to keep a high utilization ratio of the first type of clouds.

7. The computer according to claim 6,
wherein the processor is configured to select for migration from the public cloud to the private cloud, among the plurality of applications, an application which is more stable than other applications of the plurality of applications when the resource utilization ratio of the private cloud falls below the second threshold;
wherein an application is more stable if at least one of the following conditions is met: (i) the application has a standard deviation of resource utilization which is smaller than the other applications, (ii) the application has a growth ratio of resource utilization which is lower than the other applications, and (iii) the application has a remaining period which is longer than the other applications.

8. The computer according to claim 1,
wherein the applications being monitored include one or more batch applications having batch intervals and one or more online applications; and
wherein the processor is configured to select for migration, from the plurality of applications, an application according to (i) whether the application is a batch application or an online application, (ii) the batch interval if the application is a batch application, and (iii) a type of threshold for migration based on resource utilization of the application including at least one of server usage rate or storage usage rate.

9. The computer according to claim 1,
wherein the application has a security requirement; and
wherein the processor is configured to select a target cloud meeting the security requirement to which to migrate the application.

10. The computer according to claim 1,
wherein the application is a composite application comprised of multiple applications which access the data; and
wherein the processor is configured to migrate the set of the composite application and the data based on resource utilization of resources including at least one of the server or the storage system.

11. The computer according to claim 1,
wherein the processor is configured to select for migration from a private cloud to a public cloud, among the plurality of applications, an application which has longer idle time.

12. A system comprising:
a storage system; and
a computer including a memory and a processor;
wherein the processor is operable to manage two types of clouds, which are private and public clouds, by using information stored in the memory, and to manage a migration of a set of an application and a data between a first type of clouds which are private clouds and a second type of clouds which are public clouds, the application running on a server of the first type of clouds, the data to be read or written by the application and being stored in the storage system of the first type of clouds;
wherein the processor manages the migration of the set of the application and the data between the first type of clouds and the second type of clouds based on resource utilization of resources including at least one of the server or the storage system so as to keep a high utilization ratio of the first type of clouds as compared to the second type of clouds;
wherein the processor is configured to migrate the set of the application and the data, from the first type of clouds including one or more private clouds to the second type of clouds including one or more public clouds, when the resource utilization of the first type of clouds exceeds a first threshold, so as to keep a high utilization ratio of the first type of clouds until the first threshold is exceeded, without regard to a utilization ratio of the second type of clouds;
wherein the first threshold is defined based on at least one of server usage rate or storage usage rate;
wherein the processor is configured to migrate the set of the application and the data, which was migrated from the first type of clouds including one or more private clouds to the second type of clouds including one or more public clouds when the resource utilization of the first type of clouds exceeded the first threshold, from the second type of clouds including one or more public clouds to the first type of clouds including one or more private clouds, when the resource utilization of the first type of clouds falls below a second threshold, so as to keep a high utilization ratio of the first type of clouds;
wherein the second threshold is defined based on at least one of server usage rate or storage usage rate;
wherein the processor is configured to select for migration from a private cloud to a public cloud, among the plurality of applications, an application which is more dynamic than other applications of the plurality of applications when the resource utilization of the private cloud exceeds the first threshold; and
wherein an application is more dynamic if at least one of the following conditions is met: (i) the application has a standard deviation of resource utilization which is larger than the other applications, (ii) the application has a growth ratio of resource utilization which is higher than the other applications, and (iii) the application has a remaining period which is shorter than the other applications.

13. The system of claim 12,
wherein the processor is configured to select for migration from the public cloud to the private cloud, among the plurality of applications, an application which is more stable than other applications of the plurality of applications when the resource utilization ratio of the private cloud falls below the second threshold;
wherein an application is more stable if at least one of the following conditions is met: (i) the application has a standard deviation of resource utilization which is smaller than the other applications, (ii) the application has a growth ratio of resource utilization which is lower than the other applications, and (iii) the application has a remaining period which is longer than the other applications.

14. A non-transitory computer-readable storage medium storing a plurality of instructions for controlling a data processor to manage migration among clouds, the plurality of instructions comprising:
instructions that cause the data processor to manage two types of clouds, which are private and public clouds, by using information stored in a memory;
instructions that cause the data processor to manage a migration of a set of an application and a data between a first type of clouds which are private clouds and a second type of clouds which are public clouds, the application running on a server of the first type of clouds, the data to be read or written by the application and being stored in a storage system of the first type of clouds;

wherein the migration of the set of the application and the data between the first type of clouds and the second type of clouds is managed based on resource utilization of resources including at least one of the server or the storage system so as to keep a high utilization ratio of the first type of clouds as compared to the second type of clouds;

instructions that cause the data processor to migrate the set of the application and the data, from the first type of clouds including one or more private clouds to the second type of clouds including one or more public clouds, when the resource utilization of the first type of clouds exceeds a first threshold, so as to keep a high utilization ratio of the first type of clouds until the first threshold is exceeded, without regard to a utilization ratio of the second type of clouds, wherein the first threshold is defined based on at least one of server usage rate or storage usage rate;

instructions that cause the data processor to monitor a plurality of applications on one type of clouds as a migration source for the migration of the set of application and the data; and instructions that cause the data processor to select for migration from a private cloud to a public cloud, among the plurality of applications, an application which is more dynamic than other applications of the plurality of applications when the resource utilization of the private cloud exceeds the first threshold;

wherein an application is more dynamic if at least one of the following conditions is met: (i) the application has a standard deviation of resource utilization which is larger than the other applications, (ii) the application has a growth ratio of resource utilization which is higher than the other applications, and (iii) the application has a remaining period which is shorter than the other applications.

15. The non-transitory computer-readable storage medium according to claim 14,
wherein the first threshold defined based on both the server usage rate and the storage usage rate.

16. The non-transitory computer-readable storage medium according to claim 14, wherein the instructions that cause the data processor to manage the migration comprise:
instructions that cause the data processor to migrate the set of the application and the data, which was migrated from the first type of clouds including one or more private clouds to the second type of clouds including one or more public clouds when the resource utilization of the first type of clouds exceeded the first threshold, from the second type of clouds including one or more public clouds to the first type of clouds including one or more private clouds, when the resource utilization of the first type of clouds falls below a second threshold so as to keep a high utilization ratio of the first type of clouds, wherein the second threshold is defined based on server usage rate and storage usage rate;
wherein the first threshold is higher than the second threshold.

17. The non-transitory computer-readable storage medium according to claim 14; wherein the plurality of instructions further comprise:
instructions that cause the data processor to migrate the set of the application and the data, which was migrated from the first type of clouds including one or more private clouds to the second type of clouds including one or more public clouds when the resource utilization of the first type of clouds exceeded the first threshold, from the second type of clouds including one or more public clouds to the first type of clouds including one or more private clouds, when the resource utilization of the first type of clouds falls below a second threshold so as to keep a high utilization ratio of the first type of clouds.

18. The non-transitory computer-readable storage medium according to claim 17, wherein the plurality of instructions further comprise:
instructions that cause the data processor to select for migration from the public cloud to the private cloud, among the plurality of applications, an application which is more stable than other applications of the plurality of applications when the resource utilization ratio of the private cloud falls below the second threshold;
wherein an application is more stable if at least one of the following conditions is met: (i) the application has a standard deviation of resource utilization which is smaller than the other applications, (ii) the application has a growth ratio of resource utilization which is lower than the other applications, and (iii) the application has a remaining period which is longer than the other applications.

19. The non-transitory computer-readable storage medium according to claim 14,
wherein the applications being monitored include one or more batch applications having batch intervals and one or more online applications; and
wherein the plurality of instructions further comprise instructions that cause the data processor to select for migration, from the plurality of applications, an application according to (i) whether the application is a batch application or an online application, (ii) the batch interval if the application is a batch application, and (iii) a type of threshold for migration based on resource utilization of the application including at least one of server usage rate or storage usage rate.

20. The non-transitory computer-readable storage medium according to claim 14,
wherein the application has a security requirement; and
wherein the plurality of instructions further comprise instructions that cause the data processor to select a target cloud meeting the security requirement to which to migrate the application.

\* \* \* \* \*